(12) United States Patent
Yokobori (10) Patent No.: US 12,072,660 B2
(45) Date of Patent: Aug. 27, 2024

(54) IMAGE FORMING APPARATUS

(71) Applicant: CANON KABUSHIKI KAISHA, Tokyo (JP)

(72) Inventor: Yuya Yokobori, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 18/168,423

(22) Filed: Feb. 13, 2023

(65) Prior Publication Data

US 2023/0280688 A1    Sep. 7, 2023

(30) Foreign Application Priority Data

Mar. 2, 2022 (JP) .................................. 2022-031975

(51) Int. Cl.
*G03G 15/00* (2006.01)
*H04N 1/00* (2006.01)

(52) U.S. Cl.
CPC ......... *G03G 15/80* (2013.01); *H04N 1/00994* (2013.01)

(58) Field of Classification Search
CPC .......................... G03G 15/80; H04N 1/00994
See application file for complete search history.

(56) References Cited

U.S. PATENT DOCUMENTS

2014/0079433 A1*    3/2014    Watanabe .............. G03G 15/80
399/107

FOREIGN PATENT DOCUMENTS

JP         2012008428 A      1/2012

* cited by examiner

*Primary Examiner* — Victor Verbitsky
(74) *Attorney, Agent, or Firm* — Canon U.S.A., Inc. IP Division (57) ABSTRACT

An image forming apparatus includes an image forming unit, a casing sheet metal, a circuit board, and a support sheet metal. The casing sheet metal includes a first surface having an opening and a second surface. The support sheet metal is housed in the casing sheet metal in an orientation in which a first edge of the support sheet metal faces the first surface of the casing sheet metal and a second edge of the support sheet metal faces the second surface of the casing sheet metal. The first edge includes an insertion portion configured to be inserted into the opening, and the second edge includes a pressing portion configured to press the second surface of the casing sheet metal in a state in which the insertion portion is inserted into the opening. Grounding of the circuit board is established via the support sheet metal and the casing sheet metal.

10 Claims, 12 Drawing Sheets

IMAGE FORMING APPARATUS

BACKGROUND

Field

The present disclosure relates to an image forming apparatus.

Description of the Related Art

Image forming apparatuses, such as a printer and a copier, include circuit boards that control electric power supply to various units, such as actuators and sensors, and process various signals. Some circuit boards are each surrounded by, for example, a metal plate that shields the circuit board from electromagnetic noise in the form of a circuit board unit with the circuit board fixed to a support frame of the image forming apparatus.

Such a type of circuit board unit has an issue that when maintenance of the image forming apparatus in a customer's site involves removal of the whole circuit board unit from the support frame and removal of the circuit boards from the circuit board unit, a lot of time is consumed in the removal and reinstallation of the circuit boards.

Japanese Patent Application Laid-open No. 2012-008428 discusses a removably installable support sheet metal on which a circuit board in a circuit board unit is mounted through a slot, eliminating the need for removing the whole circuit board from a support frame in maintenance, which reduces the maintenance time.

It is a common practice to insert a support sheet metal, on which a circuit board is installed, into a casing sheet metal serving as a housing of a circuit board unit and fasten the support sheet metal with screws, to establish grounding between the casing sheet metal and the support sheet metal.

Because fastening with screws on the side near to a service person is easy but screws on the inner side away from the service person are difficult to access in maintenance of the circuit board unit having the above-described configuration, the housing is provided with a positioning protrusion and a slit or hole in which the protrusion is put, and the support sheet metal is provided with the other, for example.

In such a configuration, grounding may not be sufficiently established at an insertion portion on the inner side due to an incomplete connection between circuit boards due to tolerances on sizes of parts or other sources, causing electromagnetic noise. In order to ensure grounding between the support sheet metal and the casing sheet metal, a leaf spring or a gasket may be disposed on the inner side of the casing sheet metal in the insertion direction of the support sheet metal. Such a configuration however includes in an increased number of parts, resulting in an increased cost.

SUMMARY

According to an aspect of the present disclosure, an image forming apparatus includes an image forming unit configured to form an image, a casing sheet metal including a first surface having an opening and a second surface formed by bending the first surface, a circuit board configured to supply electric power to the image forming unit, and a support sheet metal configured to support the circuit board, wherein the support sheet metal is housed in the casing sheet metal in an orientation in which a first edge of the support sheet metal faces the first surface of the casing sheet metal and a second edge of the support sheet metal faces the second surface of the casing sheet metal, wherein the first edge includes an insertion portion configured to be inserted into the opening, and the second edge includes a pressing portion configured to press the second surface of the casing sheet metal in a state in which the insertion portion is inserted into the opening, and wherein grounding of the circuit board is established via the support sheet metal and the casing sheet metal.

Further features of the present disclosure will become apparent from the following description of exemplary embodiments with reference to the attached drawings.

DESCRIPTION OF THE EMBODIMENTS

An exemplary embodiment of the present disclosure will be described in detail with reference to the drawings. Unless otherwise specified, the dimensions, materials, shapes, relative positions, and the like in the exemplary embodiment are not intended to limit the scope of the present disclosure.

(Outline Configuration of Image Forming Apparatus)

A description will be given of an image forming apparatus 100 according to the present exemplary embodiment with reference to the drawings. Members, parts, or functions equivalent to each other are denoted by the same number in the drawings. The image forming apparatus 100 having a configuration for installation of a circuit board unit will be described with reference to FIG. 1.

Figure 1:
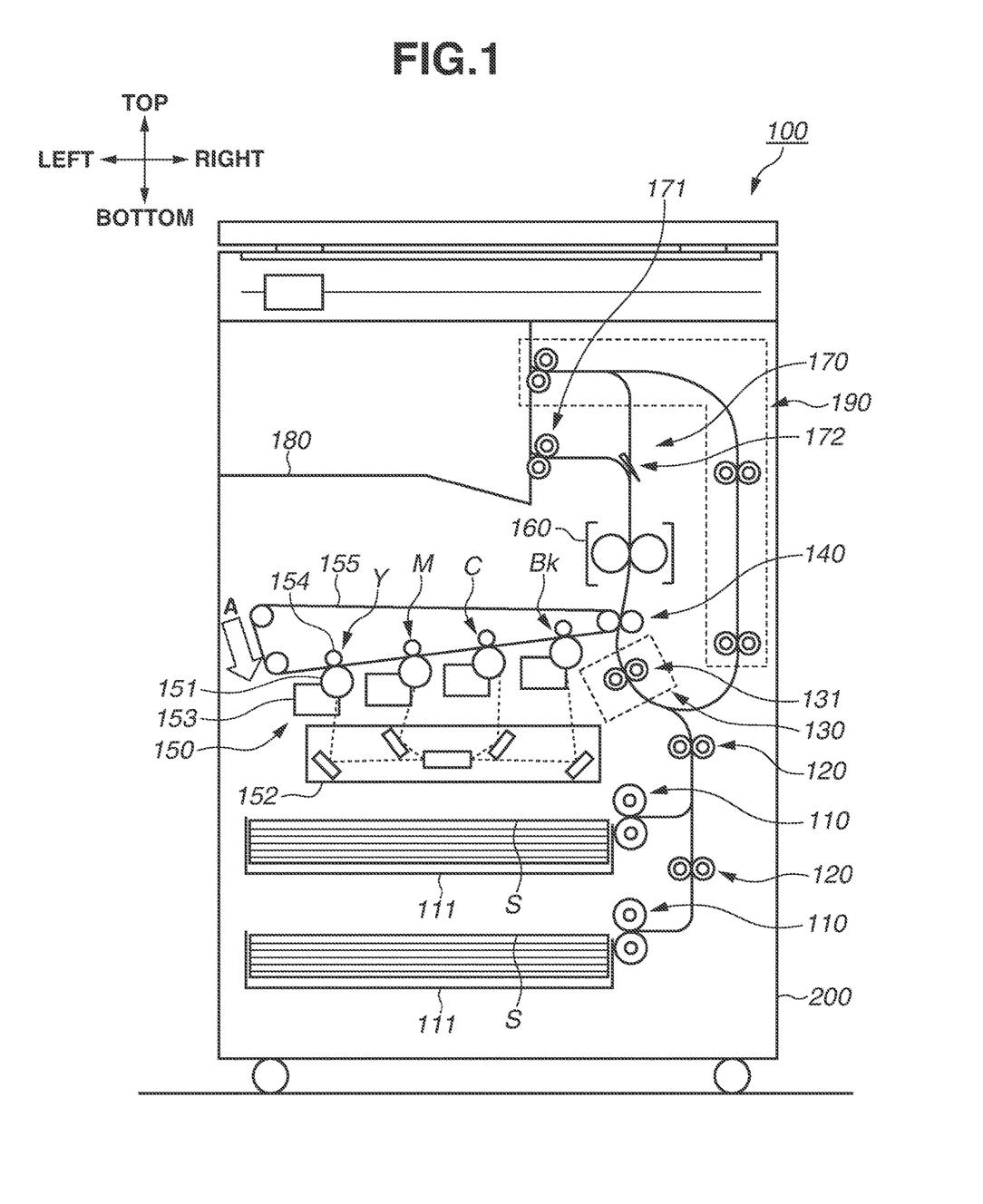
FIG. 1 is a schematic cross-sectional view illustrating an image forming apparatus.

FIG. 1 is a schematic cross-sectional view illustrating the image forming apparatus 100 including the circuit board unit. The front (hereinbelow sometimes referred to as front side or operator's side) of the image forming apparatus 100 in the following descriptions indicates the side seen in FIG. 1, and the back (hereinbelow sometimes referred to as back side or inner side) of the image forming apparatus 100 indicates a side opposite to the front. The left and the right of the image forming apparatus 100 indicates a left side and a right side, respectively, in the horizontal directions when the image forming apparatus 100 is viewed from the front. The top and the bottom of the image forming apparatus 100 indicates a top side and a bottom side, respectively, in the direction opposite to gravity and in the direction of gravity.

Image information transmitted via an external connection cable is processed by a controller (not illustrated). In accordance with signals based on a result of the processing, laser light is emitted from a laser scanner 152 to form an electrostatic latent image on a photosensitive drum 151. The electrostatic latent image on the photosensitive drum 151 is developed by a developing unit 153, and a toner image is formed on the photosensitive drum 151. After the forming of the toner image, a primary transfer device 154 provides a predetermined pressing force and an electrostatic load bias to the photosensitive drum 151 to transfer the toner image onto an intermediate transfer belt 155. The image forming apparatus 100 illustrated in FIG. 1 includes a set of image forming units 150 of respective four colors yellow (Y), magenta (M), cyan (C), and black (BK).

Next, the intermediate transfer belt 155 will be described. The intermediate transfer belt 155 is driven and rotated in the direction of an arrow A illustrated in FIG. 1. The image forming units 150 of Y, M, C and BK are controlled in parallel. An image forming process for each of the colors is performed at a timing for synchronization with overlaying of the toner image on an upstream toner image primary-transferred on the intermediate transfer belt 155. As a result, a full-color toner image is formed on the intermediate transfer belt 155, and is conveyed to a secondary transfer unit 140.

Meanwhile, a sheet feeding unit 110 separates sheets S stacked on a cassette 111 one by one and feeds the separated sheet S to a sheet conveyance path. The fed sheet S is conveyed toward a conveyance roller pair 120 disposed downstream from the sheet feeding unit 110 in the sheet conveyance direction. The sheet S is further conveyed to a sheet skew correction apparatus 130 including a registration roller pair 131, and a skewed sheet S is corrected. After the skew correction for the sheet S, the sheet S is conveyed to the secondary transfer unit 140 by the conveyance roller pair 120 and the registration roller pair 131.

After the conveyance process of the sheet S and the image forming process as described above, the full-color toner image is secondarily-transferred on the sheet S at the secondary transfer unit 140.

After the secondary transfer, the sheet S is conveyed to a fixing unit 160. In the fixing unit 160, a predetermined pressing force between members, such as a roller and a belt or the like, substantially opposed to each other and typically, heating by a heat source, such as a heater or the like, are applied to the full-color toner image on the sheet S, and the full-color toner image is fused and fixed on the sheet S. The sheet S, on which the full-color toner image has been fixed in the above-described way, passes through a post-fixing conveyance unit 170 and is stacked in alignment with other sheets S by a sheet discharge roller pair 171 on a sheet discharge tray 180 disposed in the image forming apparatus 100. In a duplex image forming process, the sheet S is conveyed toward a reverse conveyance apparatus 190 through a selection of sheet conveyance paths performed by a switching flap 172.

(Configuration of Circuit Board Unit)

A description will be given of a state of a circuit board unit 300 disposed on a support frame 200 of the image forming apparatus 100 and a configuration of the circuit board unit 300 with reference to FIGS. 2 to 12.

Figure 2:
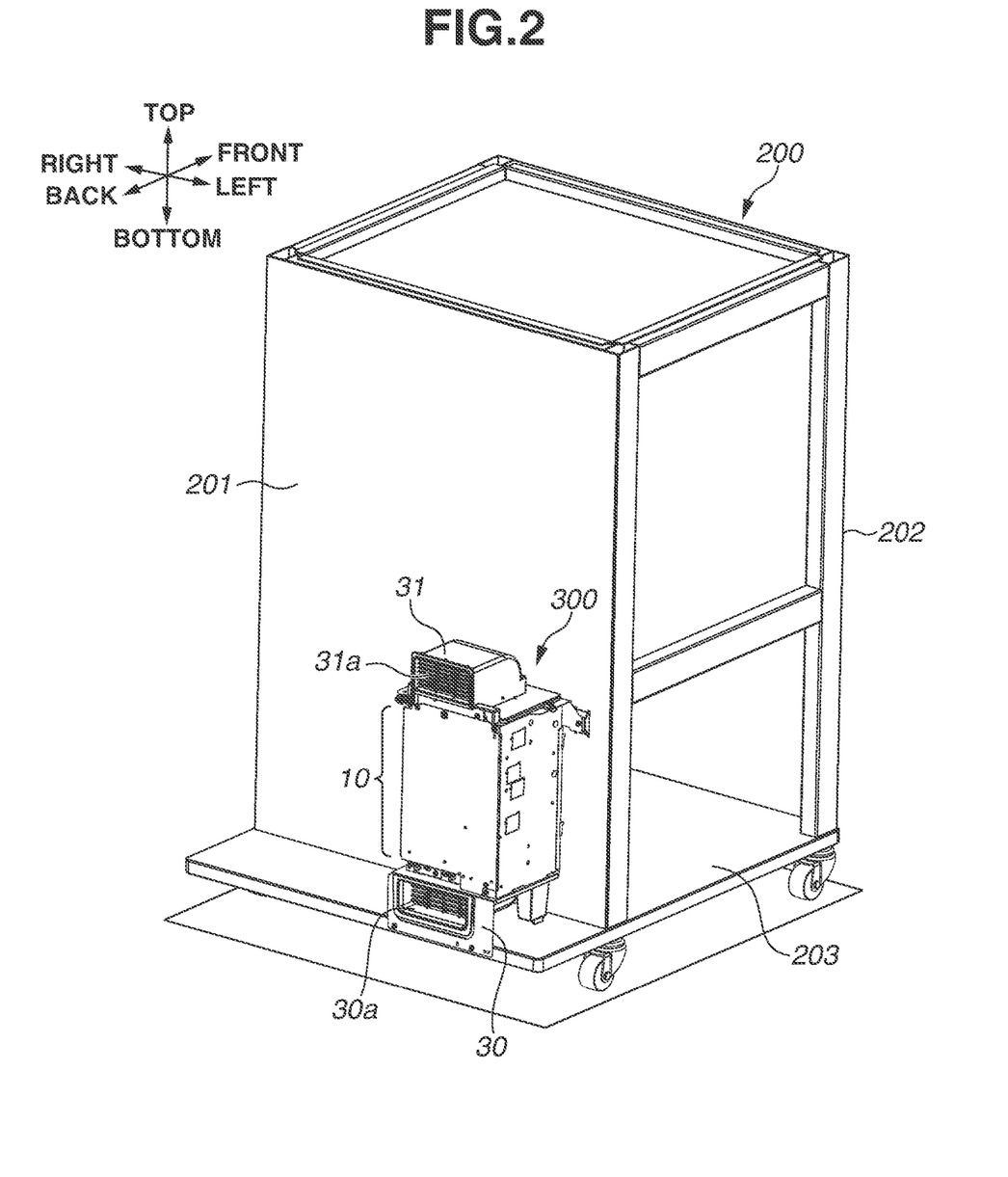
FIG. 2 is a perspective view illustrating a support frame on which a circuit board unit is attached.
Figure 3:
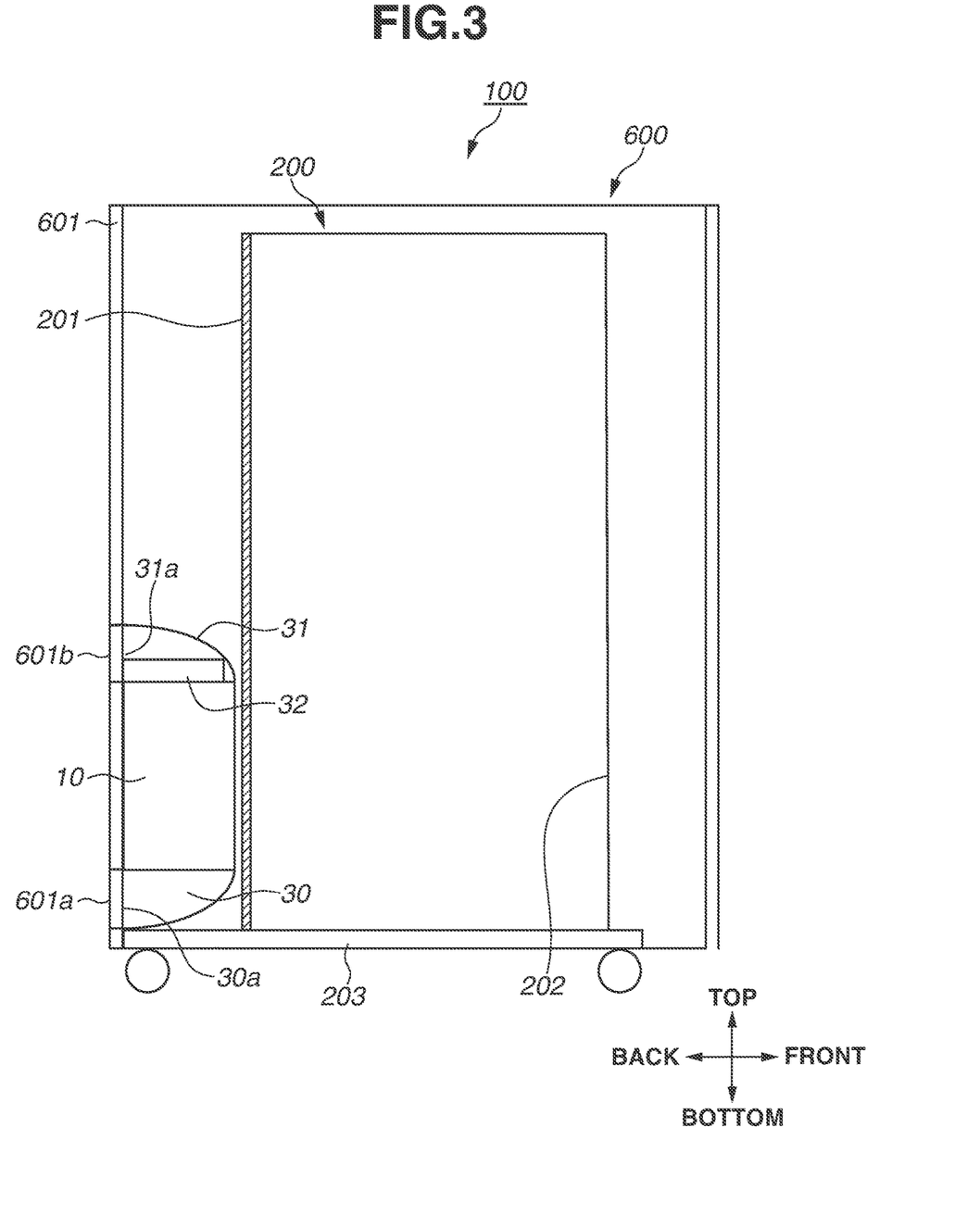
FIG. 3 is a schematic view illustrating a positional relationship between an exterior cover of the image forming apparatus and the circuit board unit.
Figure 4:
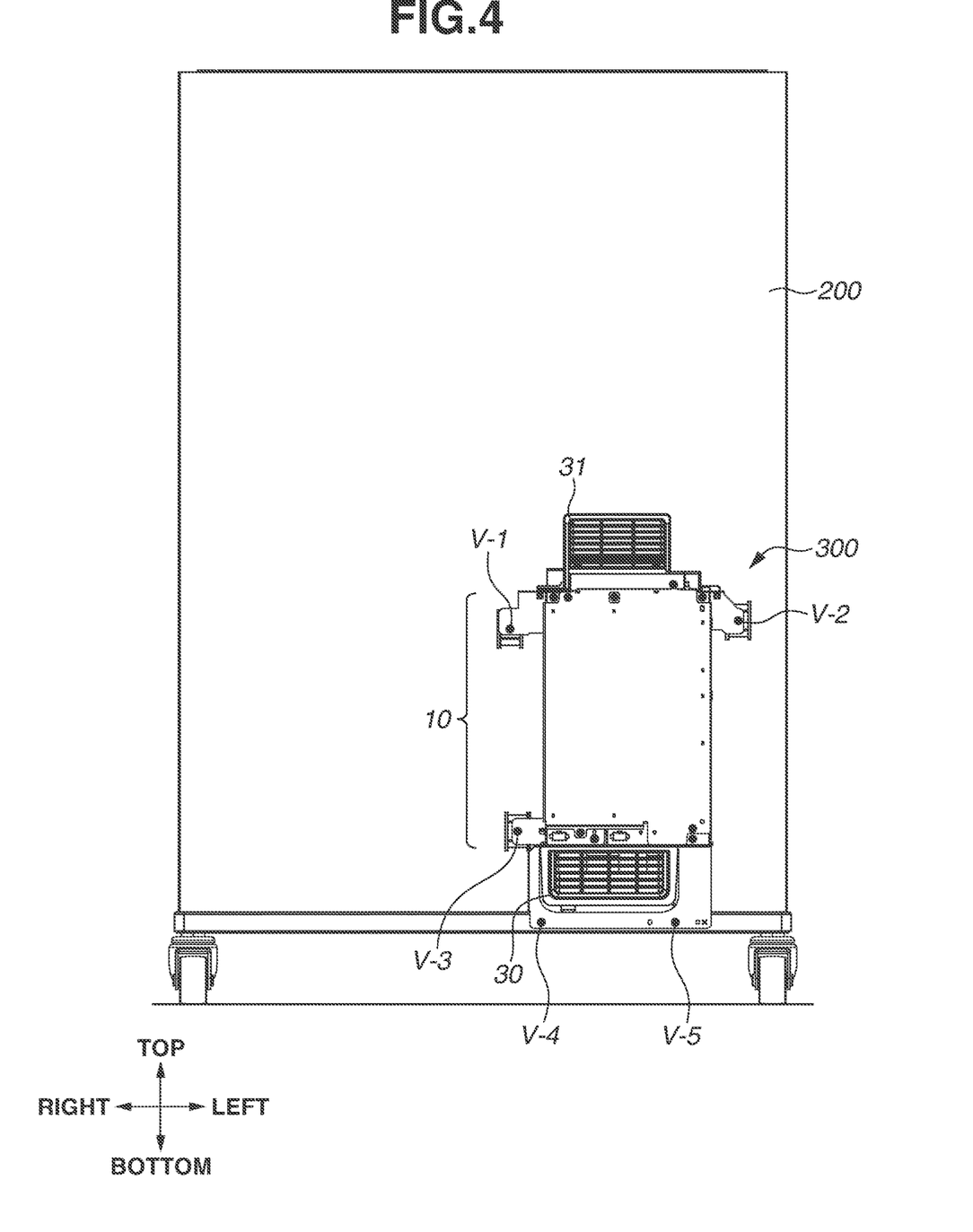
FIG. 4 is a view illustrating a back side of the support frame on which the circuit board unit is attached.

FIG. 2 is a perspective view illustrating the whole support frame 200. FIG. 3 is a schematic view illustrating a positional relationship between an exterior cover 600 of the image forming apparatus 100 and the circuit board unit 300. FIG. 4 is a view illustrating the support frame 200 when viewed from the back of the image forming apparatus 100. For a simple description, other units and exterior members supported by the support frame 200, and wiring between the circuit board unit 300 and other electrical units are not illustrated.

The support frame 200 formed of a sheet metal includes a back side plate 201 disposed on the back side, a front side plate 202 disposed on the front side, in front-back directions, respectively, and a bottom plate 203 that supports the back side plate 201 and the front side plate 202. The bottom plate 203 is provided with casters, which allow the image forming apparatus 100 to be moved on the casters.

The image forming units 150 are held between the back side plate 201 and the front side plate 202. The support frame 200 holds the cassette 111 in such a manner that the cassette 111 is able to slide out ahead from the image forming apparatus 100.

The circuit board unit 300 includes a circuit board housing unit 10, an upstream air duct 30 disposed below the circuit board housing unit 10 in the vertical direction, a downstream air duct 31 disposed above the circuit board housing unit 10 in the vertical direction.

As illustrated in FIG. 3, the circuit board unit 300 is disposed at a position that is inside the image forming apparatus 100 and is between a back cover 601 of the exterior cover 600 of the image forming apparatus 100 and a back side plate 201 of the support frame 200. With the back cover 601 removed, the position where the circuit board unit 300 is disposed is an easily accessible area for a service person.

The upstream air duct 30 is provided with an air inlet 30a into which outside air is taken toward the circuit board unit 300 via a ventilation hole 601a in the back cover 601. The downstream air duct 31 is provided with an air outlet 31a from which the air inside the circuit board unit 300 is exhausted via a ventilation hole 601b in the back cover 601.

The circuit board housing unit 10 is a rectangular-shaped housing enclosing circuit boards with sheet metals on the four sides other than the sides communicating with the upstream air duct 30 and the downstream air duct 31.

As illustrated in FIG. 4, the circuit board unit 300 is fixed to the support frame 200 with screws V-1 to V-5, and the circuit board unit 300 is grounded to the support frame 200 at each of the screw fastening portions. As for the support frame 200, grounding is established with a ground wire that is connected to a commercial power supply receptacle together with a plug, via a power supply unit (not illustrated). The above-described configuration prevents generation of noise due to an unstable connection between the support frame 200 and the circuit board unit 300.

Figure 5:
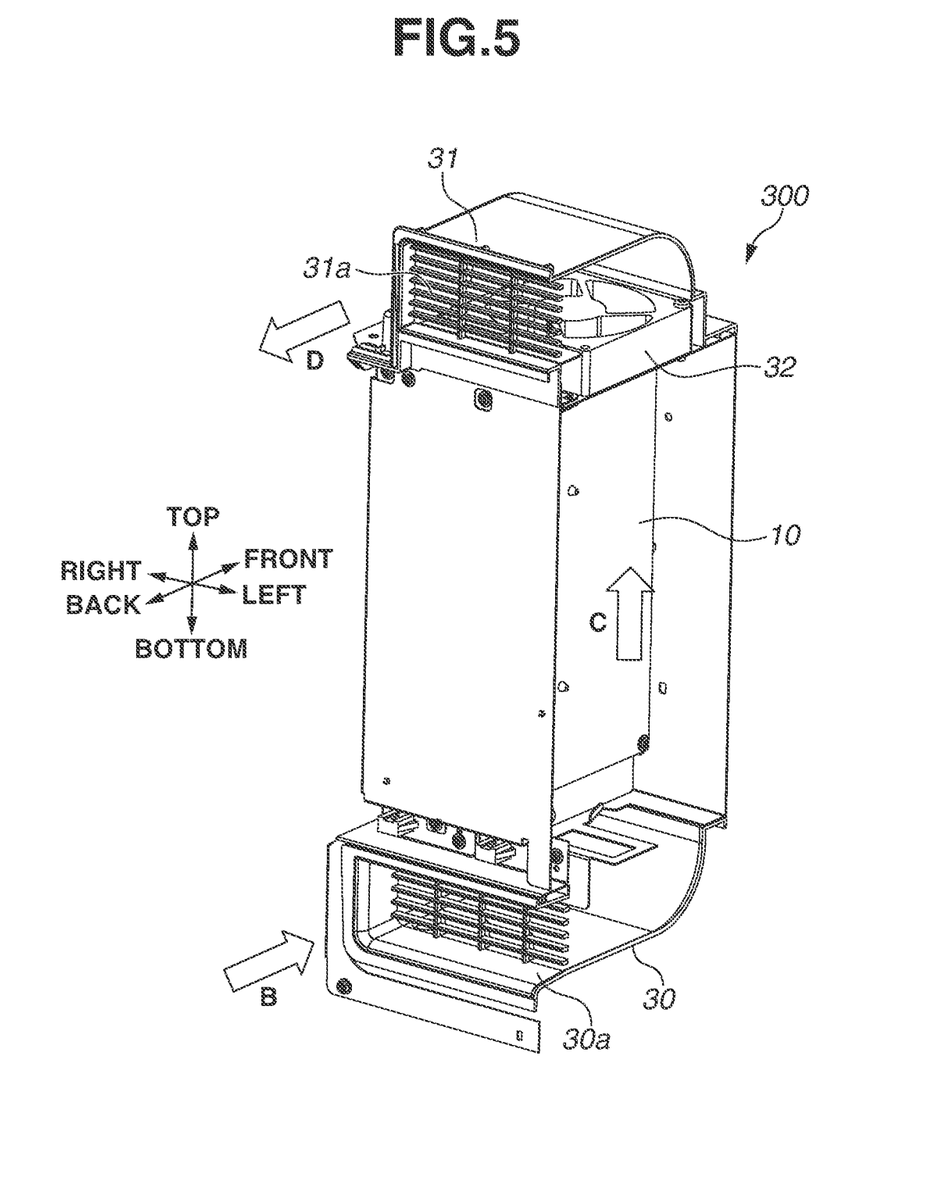
FIG. 5 is a cross-sectional view illustrating the inside of the circuit board unit.

FIG. 5 is a cross-sectional view illustrating the inside of the circuit board unit 300. As illustrated in FIG. 5, the circuit boards housed in the circuit board housing unit 10 are used in the supply of electric power, and the temperature of the circuit boards rises when electric power is supplied to each unit in the image forming apparatus 100.

For this reason, a fan 32 disposed inside the downstream air duct 31 is driven to take outside air into the circuit board housing unit 10 from the air inlet 30a of the upstream air duct 30 in the direction of an arrow B (forward direction). The flow of air by the fan 32 in the direction of an arrow C (top direction) sends heat generated inside the circuit board housing unit 10 toward the downstream air duct 31 and is exhausted in the direction of an arrow D (back direction) to forcibly cool the circuit board housing unit 10 with air.

The upstream air duct 30 is an example of an air inlet duct that is provided with the air inlet 30a to take outside air into the circuit board housing unit 10 via communication holes 11a. The downstream air duct 31 is an example of an air outlet duct that is provided with the air outlet 31a to exhaust the air inside the circuit board housing unit 10 via a communication hole 11b.

Figure 6:
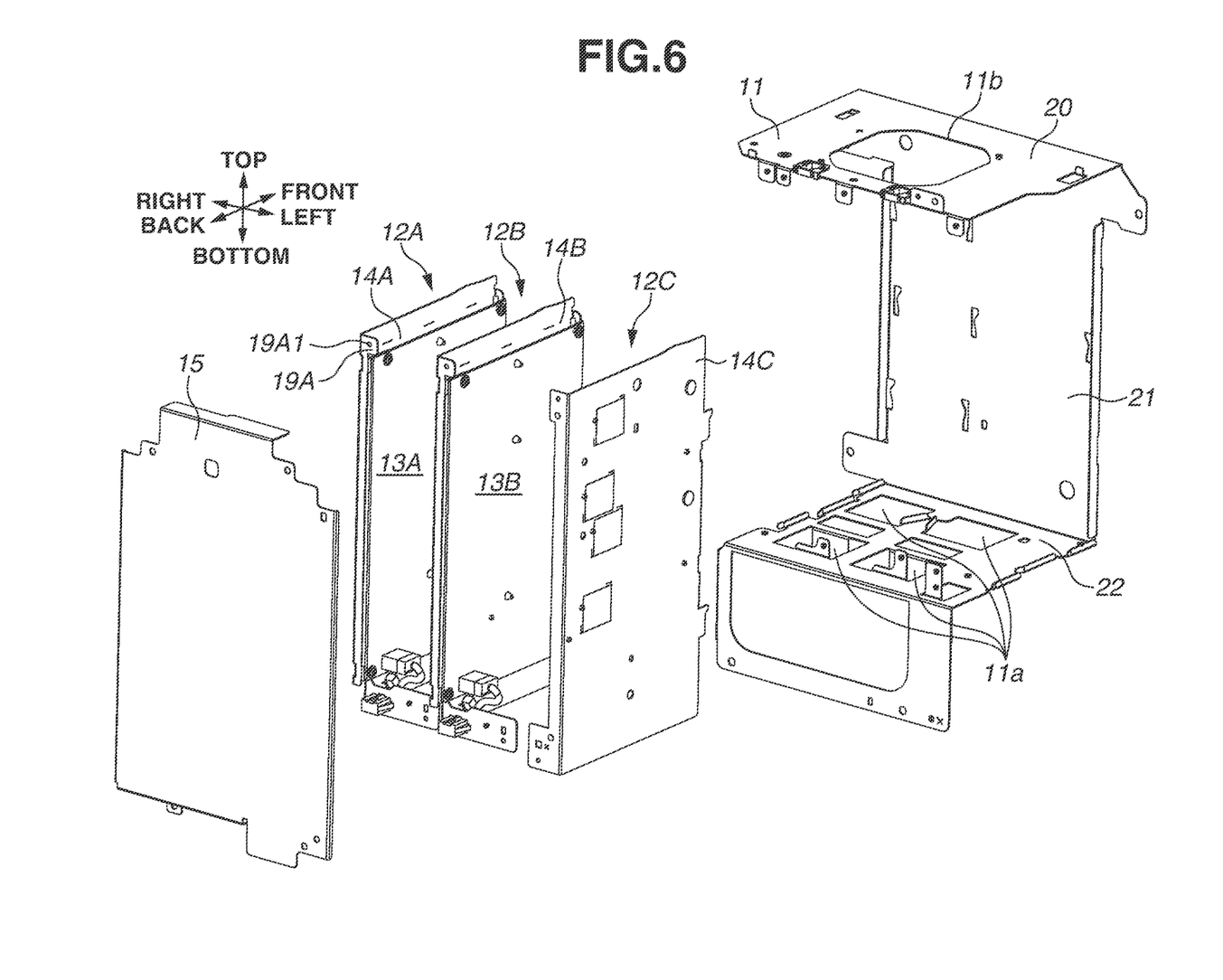
FIG. 6 is an exploded perspective view illustrating a circuit board housing unit.

A detailed description will be given of the circuit board housing unit 10, in which the circuit boards are housed, in the circuit board unit 300. FIG. 6 is an exploded perspective view of parts included in the circuit board housing unit 10. In FIG. 6, screws to fasten parts to each other are omitted. The circuit board housing unit 10 includes a casing sheet metal 11, circuit board support units 12A to 12C, and a cover sheet metal 15. The circuit board support units 12A to 12C include circuit boards 13A to 13C, respectively, and circuit board support sheet metal 14A to 14C, respectively. The circuit boards 13A to 13C are used in the supply of electric power. The circuit board support sheet metal 14A to 14C supports the circuit boards 13A to 13C, respectively. The circuit board 13C is not illustrated in FIG. 6 but is fixed on the surface of the circuit board support sheet metal 14C facing the circuit board 13B.

The casing sheet metal 11 has a top surface member 20 facing a first side of the circuit board 13A, a bottom surface member 22 facing a second side opposite to the first side of the circuit board 13A, and a side surface member 21 facing a third side connecting between the first side and the second side of the circuit board 13A. The casing sheet metal 11 has an L-shape formed by the top surface member 20 and the side surface member 21. The casing sheet metal 11 has another L-shape formed by the bottom surface member 22 and the side surface member 21.

More specifically, the casing sheet metal 11 has a squared U-shape formed by bending a sheet metal. The top surface member 20 has the communication hole 11b communicating with the downstream air duct 31, and the bottom surface member 22 has the communication holes 11a communicating with the upstream air duct 30. The communication hole 11b is an example of a first communication part, and the communication holes 11a are an example of a second communication part. Since the casing sheet metal 11 is formed of a sheet metal, which allows the casing sheet metal 11 to be elastically deformed to some extent.

As described above, the circuit board housing unit 10 forms a rectangular-shaped duct with the aforementioned parts surrounding the four sides other than the side having the communication holes 11a communicating with the upstream air duct 30 and the side having the communication hole 11b communicating with the downstream air duct 31.

The circuit board support units 12A to 12C are inserted in the space surrounded by a plurality of the surface members of the casing sheet metal 11 and are fastened with screws, whereby the circuit board housing unit 10 has a high-strength box-shaped form. With the cover sheet metal 15 in addition to the boxed-shaped form, the circuit board housing unit 10 has walls on the front, back, left, and right sides, forming the circuit board housing unit 10 in a duct shape having the communication holes 11a serving as an air inlet port in the bottom and the communication hole 11b serving as an air exhaust port in the top. The duct form is partitioned into two sections by the circuit board support unit 12B.

A detailed description will be given of the circuit board support units 12A to 12C. The circuit board support units 12A to 12C are different in the type of circuit board being installed, and the shapes of the circuit board support sheet metals 14A to 14C and the ways to insert the circuit board support units 12A to 12C into the casing sheet metal 11 are similar to one another. The circuit board support unit 12A is taken as an example in the below description, and the redundant descriptions of the circuit board support units 12B and 12C are omitted.

Figure 7:
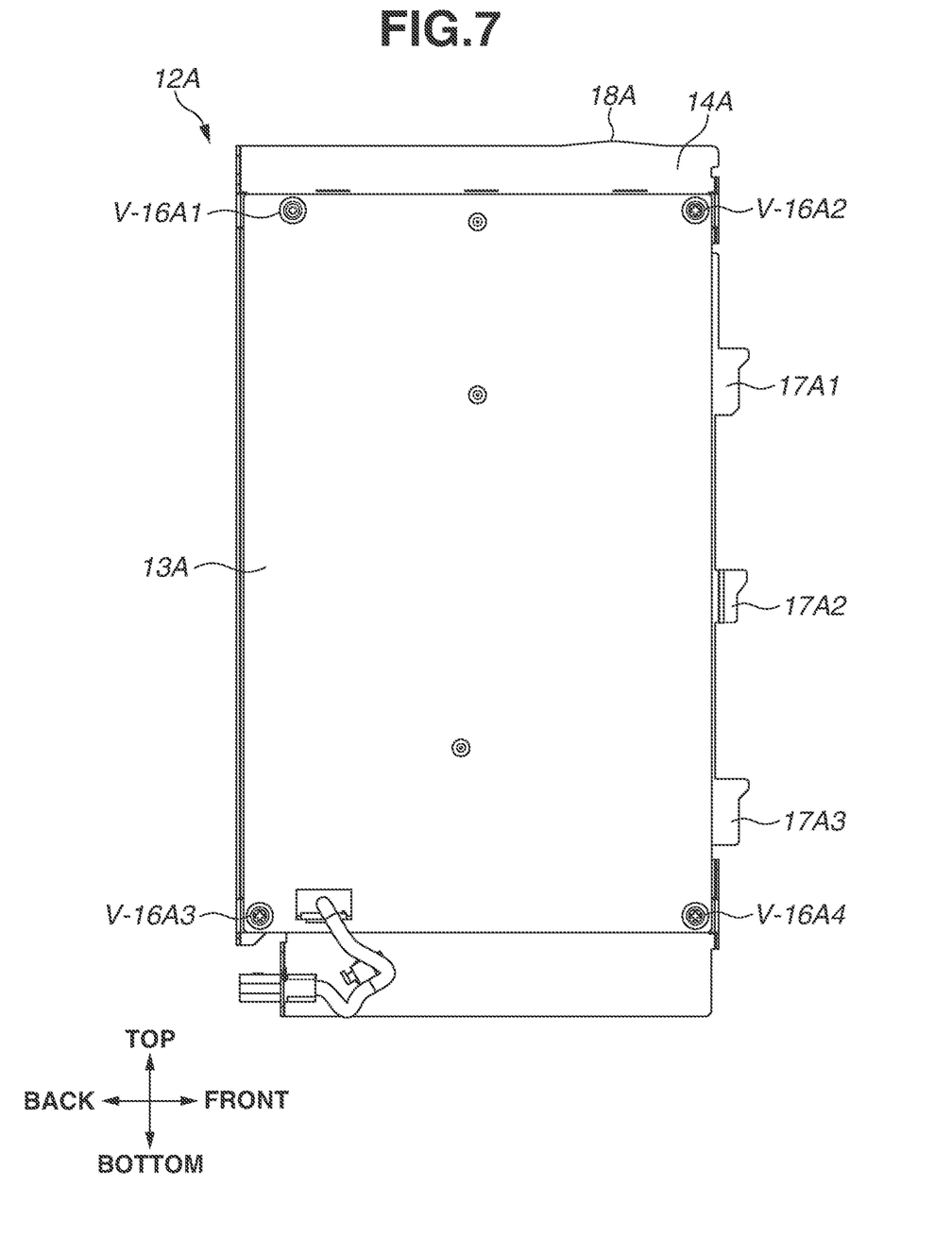
FIG. 7 is an elevation view illustrating a circuit board support unit.
Figure 8:
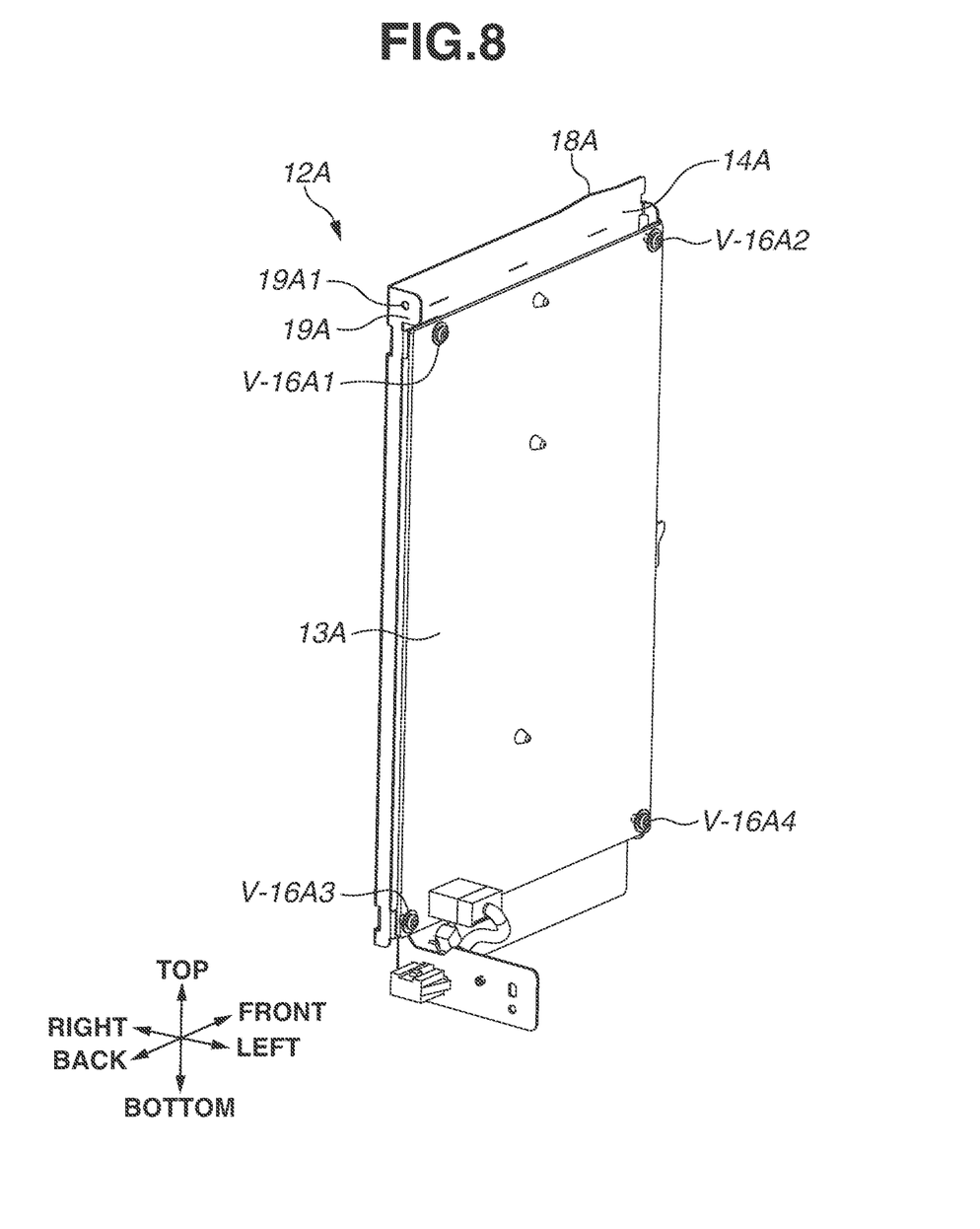
FIG. 8 is a perspective view illustrating the circuit board support unit.

FIG. 7 is an elevation view illustrating the circuit board support unit 12A, and FIG. 8 is a perspective view illustrating the circuit board support unit 12A. As illustrated in FIGS. 7 and 8, the circuit board support unit 12A is a unit in which the circuit board 13A as an electric power supply circuit board used in the supply of electric power to each unit of the image forming apparatus 100 is fixed on and supported by the circuit board support sheet metal 14A. The circuit board 13A is fastened with screws V-16A1 to V-16A4 to the circuit board support sheet metal 14A, whereby the circuit board 13A is grounded to the circuit board support sheet metal 14A.

The circuit board support sheet metal 14A also includes a fixing part 19A in which a circular hole 19A1 is formed, and a screw V-19A1 described below in the circular hole 19A1 is fastened to fix the circuit board support sheet metal 14A to the casing sheet metal 11.

Figure 9:
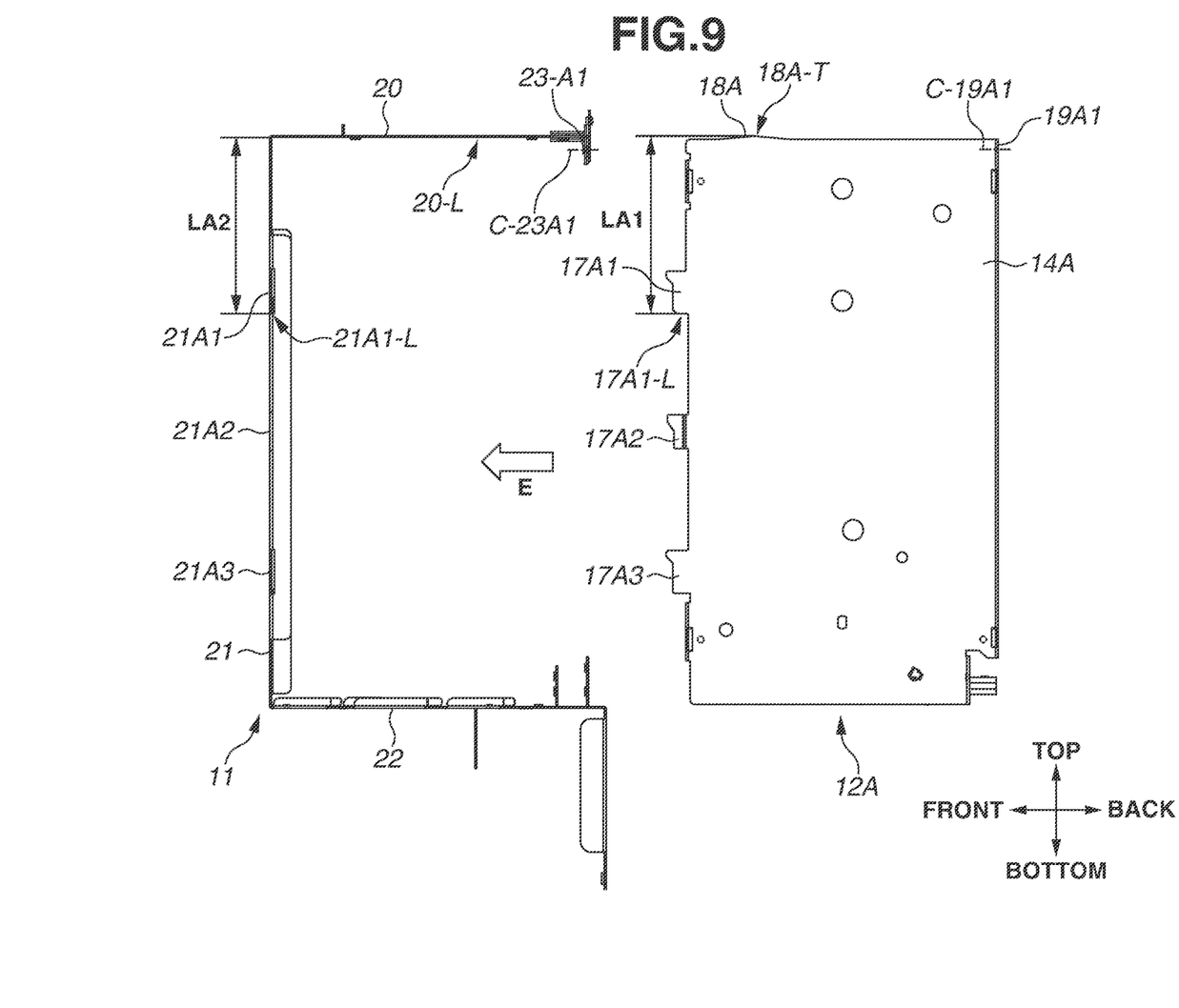
FIG. 9 is a view illustrating a state before the circuit board support unit is inserted into the casing sheet metal.
Figure 10:
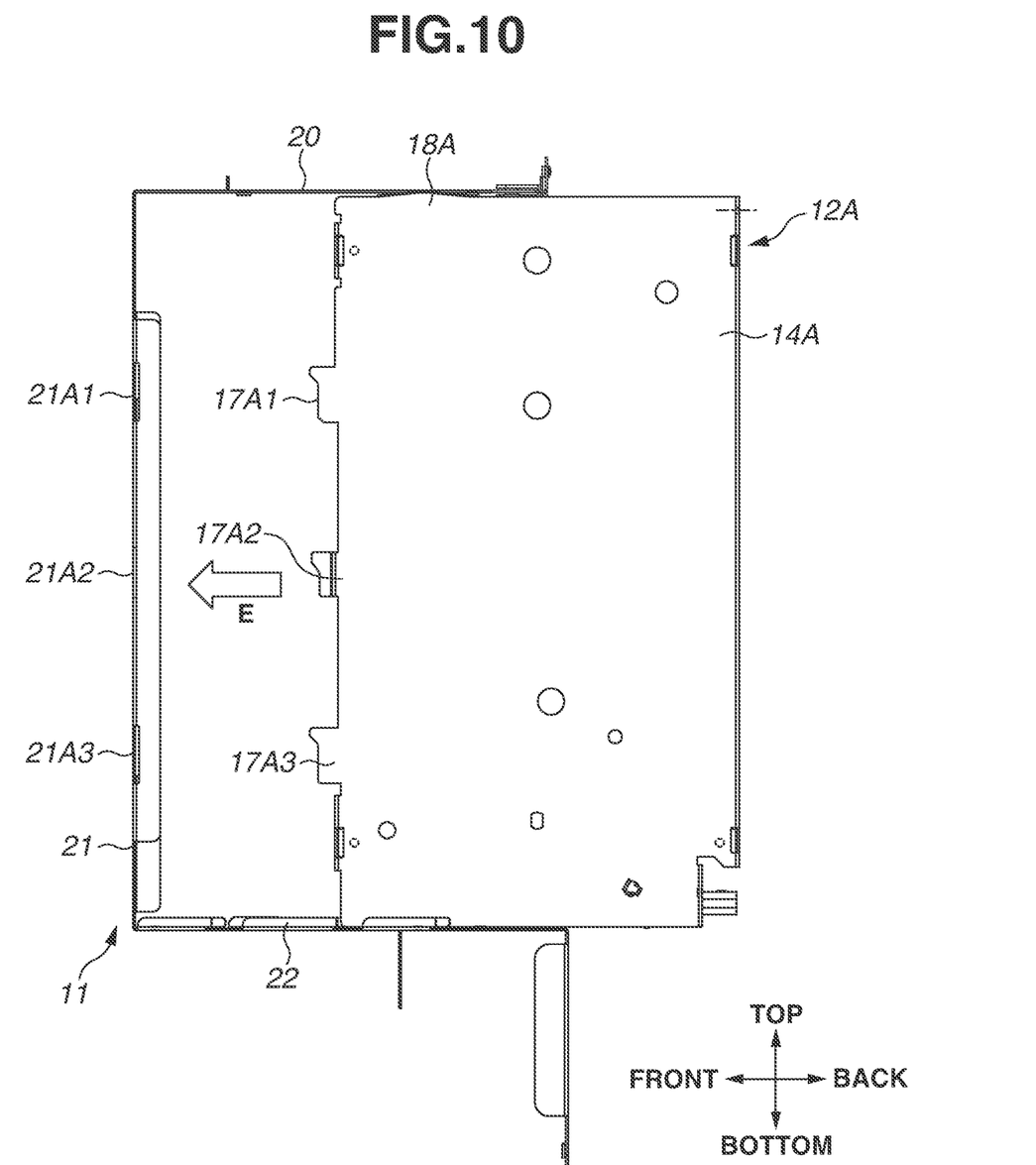
FIG. 10 is a view illustrating a state of the circuit board support unit being inserted partway into the casing sheet metal.
Figure 11:
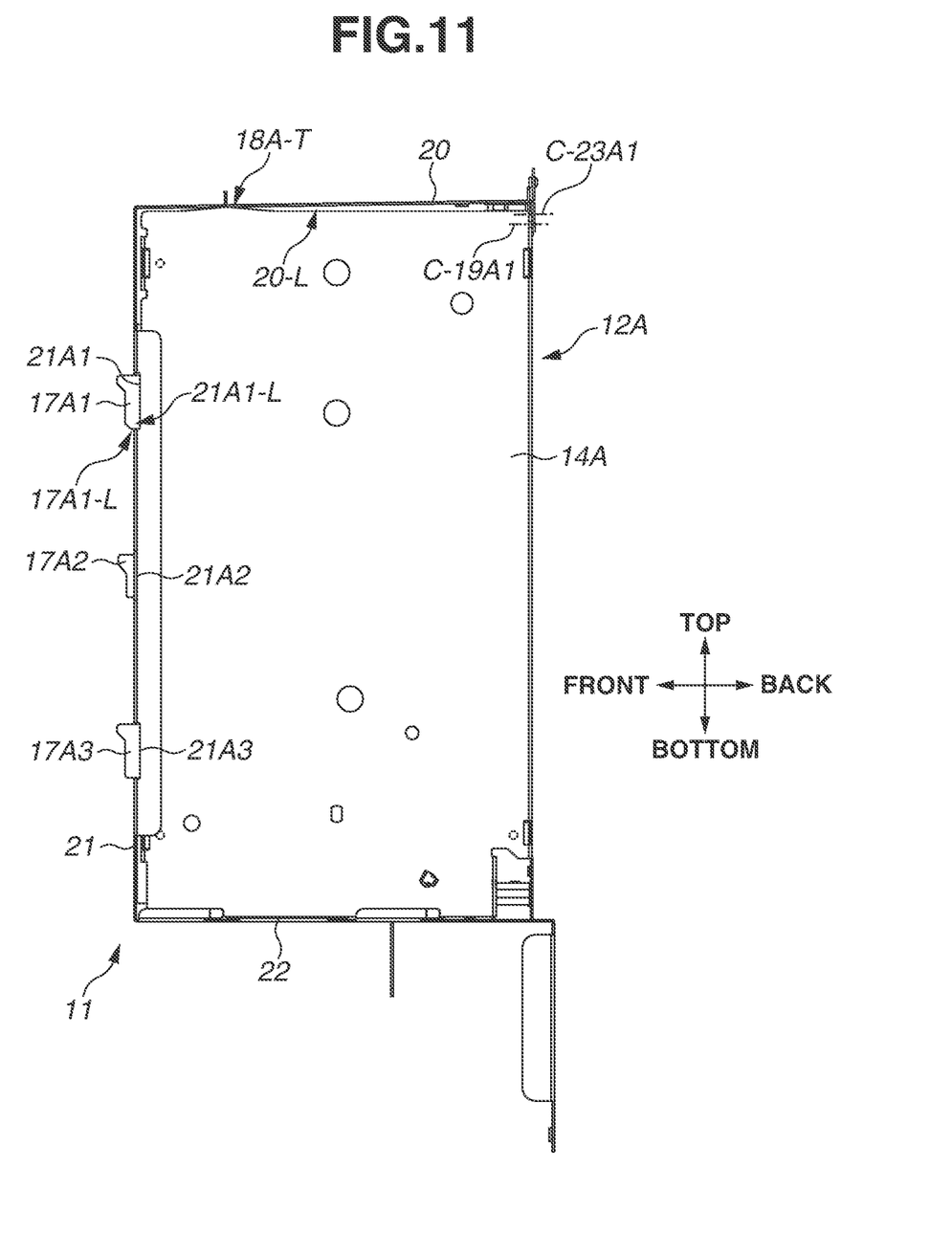
FIG. 11 is a view illustrating a state of the circuit board support unit completely inserted into the casing sheet metal.
Figure 12:
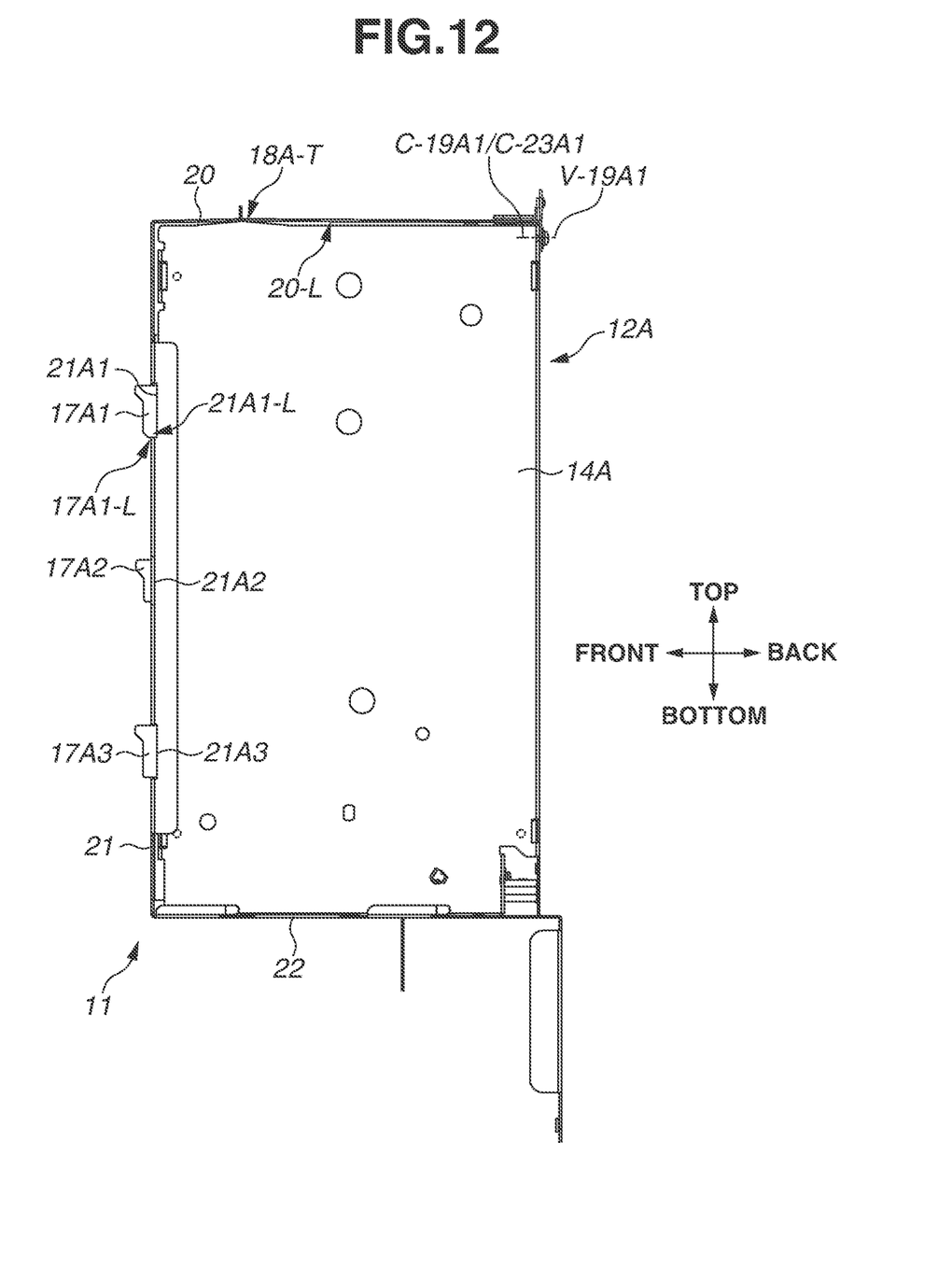
FIG. 12 is a view illustrating a state of the circuit board support unit fastened to the casing sheet metal with screws.

FIGS. 9 to 12 are schematic views illustrating states of the circuit board support unit 12A being inserted into the casing sheet metal 11. FIG. 9 illustrates a state before the insertion. FIG. 10 illustrates a state during the insertion. FIG. 11 illustrates a completion state of the insertion. FIG. 12 illustrates a state of the circuit board support unit 12A and the casing sheet metal 11 fastened with each other with the screw V-19A1 inserted into a tapped hole 23-A1.

As illustrated in FIG. 9, the circuit board support unit 12A is inserted into the casing sheet metal 11 in the direction of an arrow E. The arrow E indicates a direction along the first side of the circuit board 13A and the back-to-front direction in FIG. 9.

The circuit board support sheet metal 14A has insertion protrusions 17A1 to 17A3 protruding in the front direction and a contact protrusion 18A protruding in the top direction. The insertion protrusion 17A1 is an example of a first protrusion and the contact protrusion 18A is an example of a second protrusion. A contact protrusion top 18A-T of the contact protrusion 18A and an insertion protrusion lower edge 17A1-L of the insertion protrusion 17A1 are separated from each other by a distance LA1 in the top-bottom direction.

The side surface member 21 of the casing sheet metal 11 has insertion holes 21A1 to 21A3 into which the insertion protrusions 17A1 to 17A3, respectively, are inserted. A corner between the top surface member 20 and the side surface member 21 of the casing sheet metal 11 and an insertion hole lower edge 21A1-L of the insertion hole 21A1 are separated from each other by a distance LA2. A distance relationship between the distance LA1 and the distance LA2 is LA1>LA2.

FIG. 10 illustrates a state during the insertion of the circuit board support unit 12A that is held between the top surface member 20 and the bottom surface member 22 of the casing sheet metal 11 and is inserted in the direction of the arrow E. In FIG. 11, the insertion is completed.

In the state illustrated in FIG. 11, the insertion protrusion 17A1 of the circuit board support sheet metal 14A is inserted into the insertion hole 21A1 of the casing sheet metal 11. The insertion protrusion 17A2 is inserted into the insertion hole 21A2, and the insertion protrusion 17A3 is inserted into the insertion hole 21A3. These approximately position the circuit board support unit 12A on the front side in the left-right direction with respect to the casing sheet metal 11. The circuit board support unit 12A is housed in the casing sheet metal 11 in an orientation in which a first edge of the circuit board support unit 12A faces a back surface of a side surface member 21 and a second edge of the circuit board support unit 12A faces a back surface 20-L of the top surface member 20. The back surface of a side surface member 21 corresponds to a first surface of the casing sheet metal 11. The back surface 20-L of the top surface member 20 corresponds to a second surface of the casing sheet metal 11.

The widths of the insertion holes 21A1 to 21A3 in the left-right direction (slit width) are more than the width of the circuit board support sheet metal 14A, and the insertion protrusions 17A1 to 17A3 do not come into contact with the insertion holes 21A1 to 21A3, respectively, in the left-right direction. Further, the lengths of the insertion holes 21A2 and 21A3 in the top-bottom direction (slit height) are more than the lengths of the insertion protrusions 17A2 and 17A3, respectively, in the top-bottom direction, and the insertion protrusions 17A2 and 17A3 do not come into contact with the insertion holes 21A2 and 21A3, respectively, in the top-bottom direction.

As described above, the distance relationship between the distance LA1 from the contact protrusion top 18A-T to the insertion protrusion lower edge 17A1-L in the top-bottom direction and the distance LA2 from a back surface 20-L of the top surface member 20 to the insertion hole lower edge 21A1-L is, however, LA1>LA2.

Consequently, the back surface 20-L of the top surface member 20 comes into contact with the contact protrusion top 18A-T while the top surface member 20 is warped in the top direction, and the insertion protrusion lower edge 17A1-L and the insertion hole lower edge 21A1-L come into contact with each other. The insertion hole lower edge 21A1-L is an example of an edge part of the insertion hole 21A1.

In the state illustrated in FIG. 11, since the top surface member 20 is warped in the top direction, a central axis C-19A1 of the circular hole 19A1 and a tapped hole central axis C-23A1 are not in alignment with each other but displaced from each other. More specifically, in the vertical direction (direction along the third side of the circuit board 13A), the fixing part 19A is at a level lower than the contact protrusion 18A.

At the end of the insertion, the upward warpage of the top surface member 20 in a part which is on the back side from the contact protrusion top 18A-T is corrected downward in the vertical direction to place the central axis C-19A1 and the tapped hole central axis C-23A1 in alignment with each other.

The screw V-19A1 is fastened into the tapped hole 23-A1 in the state in which the top surface member 20 is warped as described above, and thus, grounding between the casing sheet metal 11 and the circuit board support sheet metal 14A is established at two points in the front side. More specifically, grounding between the back surface 20-L of the top surface member 20 and the contact protrusion top 18A-T and grounding between the insertion protrusion lower edge 17A1-L and the insertion hole lower edge 21A1-L are properly established. Further, the grounding at the two points is maintained by the fastening of the screw V-19A1.

In the back-to-front direction, the contact protrusion 18A is disposed at a position closer to the insertion protrusion 17A1 than the fixing part 19A. More specifically, the contact protrusion 18A is disposed at the position on the front side from the center in the back-to-front direction (disposed at inner side (downstream side)) in the insertion direction of the circuit board support unit 12A). Because of the configuration, a part of the top surface member 20 of the casing sheet metal 11 near the fixing part 19A is easily warped, and the screw V-19A1 can be easily fastened.

Configurations of grounding in insertion of the circuit board support units 12B and 12C are similar to the configuration of the circuit board support unit 12A illustrated in FIGS. 9 to 12.

The above-described configuration allows grounding between the circuit board unit 300 and the support frame 200 at the position that is on the inner side and is not easily accessible for the service person to be easily established in maintenance without providing a spring and a gasket for grounding on the downstream side in the insertion direction of the circuit board support units 12A to 12C. Further, the above-described configuration provides a high workability for service workers, and a reduced cost and high reliability of the image forming apparatus, and allows reduction of the risk of noise generation.

In maintenance of the circuit board 13A, the back cover 601 illustrated in FIG. 3 is removed, the cover sheet metal 15 is removed, and then, the circuit board support unit 12A is pulled out by following the steps illustrated in FIGS. 9 to 12 in reverse order. Thus, maintenance of the circuit board 13A can be performed without removing the circuit board housing unit 10 from the support frame 200. Similar to the circuit board support unit 12A, the circuit board support units 12B and 12C are also insertable and removable in the back-front direction and in the front-back direction in FIG. 6, respectively, and thus maintenance of the circuit board support units 12B and 12C can also be easily performed.

While, in the present exemplary embodiment, the number of the circuit board support units inside the circuit board unit 300 is three, the number of the circuit board support units may be one or more than three.

In the above-described configuration, the desirable dimensions to obtain a sufficient effect of the embodiment in which grounding between the circuit board support units 12A to 12C and the casing sheet metal 11 can be established by simply inserting the circuit board support units 12A to 12C into the casing sheet metal 11 are as follows: LA1 is more than or equal to 50 millimeters (mm) and less than or equal to 80 mm, and LA1−LA2 is more than or equal to 0.5 mm and less than or equal to 1 mm.

The desirable thickness of the casing sheet metal 11 to allow the top surface member 20 of the casing sheet metal 11 to be warped without effort is more than or equal to 0.6 mm and less than or equal to 1.0 mm.

As described above, in the present exemplary embodiment, when the circuit board support units 12A to 12C on which the circuit boards 13A to 13C, respectively, are installed are fixed to the casing sheet metal 11, grounding between the back surface 20-L of the top surface member 20 of the casing sheet metal 11 and the contact protrusion top 18A-T and grounding between the insertion protrusion lower edge 17A1-L and the insertion hole lower edge 21A1-L are established. Grounding of the circuit board units can be ensured with the above-described simple configuration without a spring and a gasket for grounding, and consequently, generation of noise from the circuit board unit can be reduced.

In the present exemplary embodiment, the circuit board unit 300 including the electric power supply circuit boards for the supply of electric power to each unit in the image forming apparatus 100 is taken as an example, the configuration of the present exemplary embodiment is applicable to a different circuit board unit.

According to the image forming apparatus 100 in the present exemplary embodiment, generation of noise can be reduced with the configuration which is simple among configurations in which a circuit board unit is inserted into the casing sheet metal through a slot and is fixed to the casing sheet metal.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-031975, filed Mar. 2, 2022, which is hereby incorporated by reference herein in its entirety.

What is claimed is:

1. An image forming apparatus comprising:
    an image forming unit configured to form an image;
    a casing sheet metal including a first surface having an opening and a second surface formed by bending the first surface;
    a circuit board configured to supply electric power to the image forming unit; and
    a support sheet metal configured to support the circuit board,
    wherein the support sheet metal is housed in the casing sheet metal in an orientation in which a first edge of the support sheet metal faces the first surface of the casing sheet metal and a second edge of the support sheet metal faces the second surface of the casing sheet metal,
    wherein the first edge includes an insertion portion configured to be inserted into the opening, and the second edge includes a pressing portion configured to press the second surface of the casing sheet metal in a state in which the insertion portion is inserted into the opening, and
    wherein grounding of the circuit board is established via the support sheet metal and the casing sheet metal.

2. The image forming apparatus according to claim 1, wherein the pressing portion of the second edge protrudes outward beyond a virtual straight line connecting both ends of the second edge.

3. The image forming apparatus according to claim 1, wherein the casing sheet metal has an L-shape formed by the first surface and the second surface.

4. The image forming apparatus according to claim 1, wherein the casing sheet metal has an L-shape formed by the first surface and the second surface, and wherein the pressing portion of the second edge protrudes outward beyond a virtual straight line connecting both ends of the second edge.

5. The image forming apparatus according to claim 1, wherein, in a direction that orthogonally intersects a sheet metal thickness direction of the support sheet metal and orthogonally intersects an insertion direction of the insertion portion into the opening, a distance from a position of a contact point of an edge of the opening with which the insertion portion comes into contact to the pressing portion is longer than a distance from the position of the contact point to the second surface in the direction.

6. The image forming apparatus according to claim 1, wherein, in a direction that orthogonally intersects a sheet metal thickness direction of the support sheet metal and orthogonally intersects an insertion direction of the insertion portion into the opening, a distance from a position of a contact point of an edge of the opening with which the insertion portion comes into contact to the pressing portion is longer than a distance from the position of the contact point to a corner between the first surface and the second surface in the direction.

7. The image forming apparatus according to claim 1, wherein the support sheet metal is screwed to the casing sheet metal.

8. The image forming apparatus according to claim 1, wherein the support sheet metal is inserted into the casing sheet metal in such a manner that a direction that orthogonally intersects a sheet metal thickness direction of the support sheet metal and orthogonally intersects an insertion direction of the insertion portion of the support sheet metal into the opening coincides with a direction of gravity.

9. The image forming apparatus according to claim 1, further comprising a cover sheet metal disposed on a side opposite to the first surface of the casing sheet metal in a direction that orthogonally intersects a sheet metal thickness direction of the support sheet metal and orthogonally intersects an insertion direction of the insertion portion of the support sheet metal into the opening,
    wherein the support sheet metal is housed in a space enclosed by the casing sheet metal and the cover sheet metal.

10. The image forming apparatus according to claim 1, further comprising:
    a support member configured to support the image forming unit; and
    a back surface cover disposed on a back side of the image forming apparatus,
    wherein the casing sheet metal is disposed between the support member and the back surface cover.

* * * * *